Patented Oct. 14, 1930

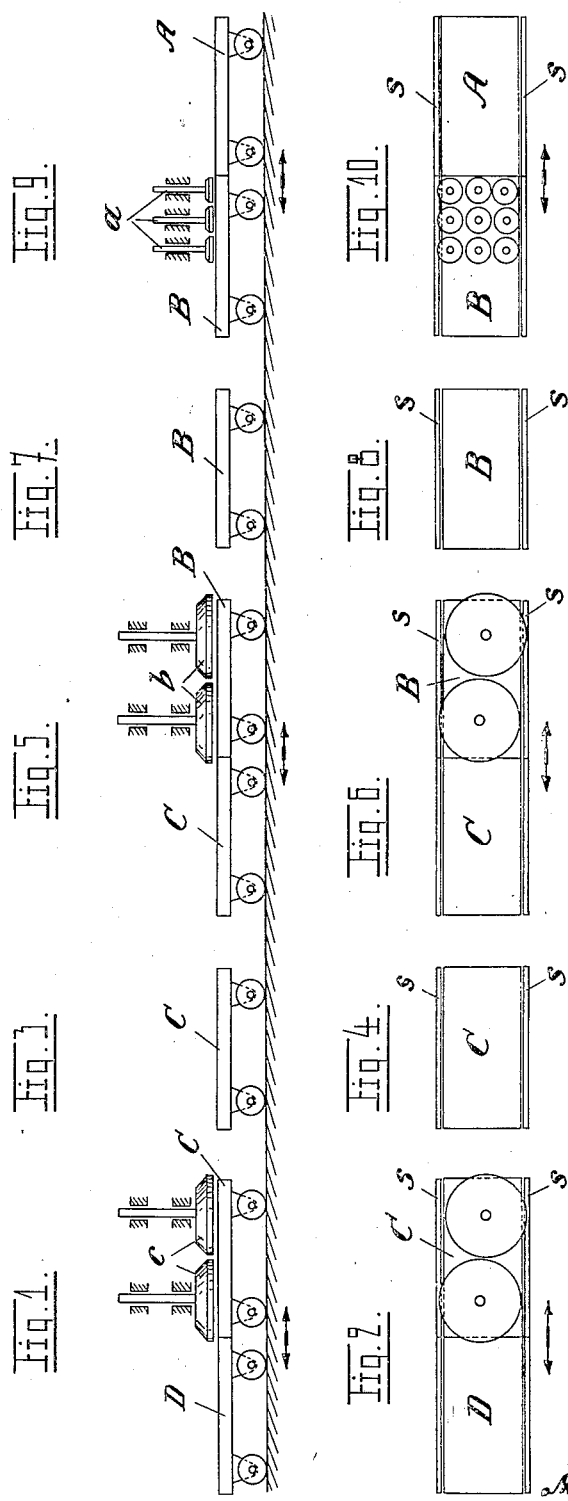

1,778,288

UNITED STATES PATENT OFFICE

MAX BICHEROUX, OF HERZOGENRATH, NEAR AIX-LA-CHAPELLE, GERMANY

GRINDING AND POLISHING GLASS PLATES

Application filed March 20, 1924, Serial No. 700,701, and in Germany March 23, 1923.

My invention refers to the grinding and polishing of glass plates, for instance mirror glass. It is an object of my invention to provide means whereby such plates can be ground and polished in a more economical and more perfect manner than has hitherto been possible.

The grinding and polishing of glass plates on a commercial scale as practised at present is mainly carried out either on circular rotary tables or on rectangular tables, a number of which is united to form a chain which travels below and past the tools. On the rotary tables the glass is carried in a continuous circular motion underneath the tools arranged above each table, which may be either coarse grinding, fine grinding or polishing tools. These tools also rotate about their axes, being in some cases given a further additional, non-rotary motion. In the case where the glass is supported on rectangular tables united to form a sort of chain this chain of tables is caused to travel in a straight line below the rotary grinding and polishing tools which are arranged in lines above the tables. As the single tables are coupled one to the other with their narrow edges contacting, the glass can be said to be carried below the tools by a sort of band conveyer. Whenever the foremost table has passed below the last of the polishing tools, it is disengaged from the chain, the polished glass is removed, the table is run back on a parallel track to be coupled with the last of the chain of tables and fresh raw glass is mounted in position thereon to be ground.

The rotary table system involves the drawback that an economical utilization of the surface of the table can only be obtained with difficulty in view of the quadrangular configuration of the plates. Moreover, the table must be brought to a standstill after the grinding or polishing of glass has come to an end in order to remove the glass and to fasten raw glass on the table.

The use of a chain of rectangular tables involves the drawback that adjoining groups of tools for coarse and fine grinding and for polishing, owing to their rapid rotation scatter the sand and the like over a comparatively wide area whereby coarse sand will get below the fine grinding tools, fine sand below the polishing tools, and the fine grinding and polishing will be disturbed and the glass will be partly spoilt. This drawback is not avoided merely by spacing the single groups of tools apart and removing the sand from the glass in the interstices, for these interstices cannot be large enough or else the time consumed in grinding and polishing would be unduly lengthened and the primary costs of a grinding and polishing installation would become unduly high owing to the greater area covered thereby. Moreover, the breaking which frequently occurs in the grinding and polishing of glass cannot be made good in a continuous moving chain of tables by repacing the broken plates by fresh plates and it will not always be possible to provide for these emergencies without bringing the entire chain of tables to a standstill.

In the process according to the present invention these drawbacks are avoided without in the least increasing the time required for the operations and without entailing higher primary costs. The new process permits careful inspection of the glass between the single operations and removal of the broken or spoilt glass without thereby affecting the other tables. An intermixing of the grinding and polishing materials (sand and the like) is excluded also.

The new process consists in carrying the tables covered with glass below the tools in pairs. After a pair of tables has been acted upon by one group of tools the front table of the pair of tables is disengaged from the rear table and is brought to a standstill between the groups of tools in order to allow the glass to be inspected. In the meantime the rear table has been coupled with another table covered with raw glass or with the front table of the next succeeding pair of tables, and this newly formed pair of tables is now carried below the same tools in order to be acted upon by them. The several groups of tools are spaced apart a distance exceeding the length of a pair of tables in such manner that a table can be brought to a standstill between them without in any way disturbing the operation of the pairs of tables preceding and succeeding it.

Assuming a pair of cooperating tables to move below each of the groups of coarse grinding, fine grinding and polishing tools, these tools being spaced apart from each other in the manner above described, after the glass on the pair of tables acted upon by the polishing tools has been polished, the forward table of this pair of tables is disengaged from the rear table and the polished glass is removed from it, whereupon the table can be covered with a fresh charge of raw glass and be moved rearwardly on a parallel track.

In the meantime the forward table of the pair of tables acted upon by the fine grinding tools has also been disengaged from the rear table and caused to pass into the interstices between the fine grinding tools and the polishing tools.

After this table has come to a standstill the finely ground glass is inspected, and, provided that it had been found to be well ground, the table with the finely ground glass is then coupled with the rear table of the pair of tables acted upon by the polishing tools, and this newly formed pair of tables is caused to pass below the polishing tools to be acted upon by them. Simultaneously the forward table of the pair of tables acted upon by the coarse grinding tools has been disengaged from the rear table and has been caused to pass into the interstice between the coarse grinding tools and the fine grinding tools. The coarsely ground glass having been inspected and found satisfactory, this table is then united with that table which is still acted upon by the fine grinding tools and is now carried with it below these tools. In the meantime there has been coupled with the rear table which was left below the coarse grinding tools another table covered with raw glass and this newly formed pair of tables is now acted upon by the coarse grinding tools.

It will be appreciated from the above description of the new process that the grinding and polishing of the glass is carried out while the glass is arranged on pairs of tables. The tables of each pair are separated after having been acted upon by a group of tools and the forward table is brought to a standstill in the interstices between adjoining groups of tools for inspection of the glass, while the rear table of the pair of tables is coupled with the forward table of a succeeding pair in order to be further acted upon together with this table by the same tools.

The advantages resulting from this mode of operation as compared with the grinding and polishing of glass mounted on single tables are the following:—

The grinding or polishing of the glass near the front and rear edges becomes more uniform, for if the tables are acted upon singly the tools partly projecting beyond the edges of the table can injure the edges of the glass plates and will not be able to act upon the parts of the glass adjoining the edges as vigorously as on the middle portions of the glass. As compared with the use of a continuously moving chain of tables the new arrangement offers the advantage that the materials, such as sand and the like, used in the single operations will not be allowed to mix with each other. On the other hand the glass can be carefully examined in the interstices between the several operations; such glass which has been found to be but imperfectly ground or polished can be caused to pass once more below the respective group of tools in order to be acted upon once more; broken glass can be replaced by fresh plates or the table can be withdrawn altogether and replaced by another table without thereby in the least affecting the other operations.

In acting on the glass with the several groups of tools it has been found preferable to cause each pair of tables to slowly move forward and back again below the tools with progressive advance, that is to say in such manner that each backward movement is somewhat shorter than the forward movement following it so that as the result of such movements the pair of tables will slowly move on in forward direction. This manner of moving warrents a particularly uniform grinding and polishing of all parts of the glass.

In order also to secure the same uniformity of those parts of the glass plates which adjoin the longitudinal edges of the tables, I sometimes arrange alongside the tables narrow auxiliary tables or supports which are covered with some suitable material, such as broken glass, plaster of Paris, metals or the like, so that their surface is flush with the glass surface on the table. With the addition of these auxiliary tables or supports the tools can operate on the glass adjoining the longitudinal edges of the tables as prefectly as on the middle portion of the glass, because those parts of the tools which project beyond the longitudinal edges are now well supported. The narrow auxiliary tables or supports may be stationary, the main tables being moved between them, or they may be coupled with the main tables to move with them.

The tools may either rotate in stationary bearings mounted above the tables or they may be arranged to move in a straight line or curves above the tables. In addition to the rectilinear movements the tables may be given an additional lateral movement. However, the means for bringing about these movements do not form part of my invention.

It would, of course, be feasible also to keep the tables at rest while the tools are caused to move above the tables, one after the other, two tables being always coupled with one another and lateral supports or tables being arranged near the longitudinal edges of the main tables. However, the arrangement first mentioned can be carried out more easily.

In the drawings affixed to this specification and forming part thereof, a number of diagrams illustrating the novel process and means for carrying it into effect are shown by way of example. In the drawings Figs. 1, 3, 5, 7 and 9 are elevations and Figs. 2, 4, 6, 8 and 10 are the respective plan views.

The drawings illustrate the gradual advancing of four tables A, B, C, D, having glass plates fixed thereon. The table A (Figs. 9 and 10) is shown in a position where it has already been acted upon by all the sets of tools. It is still coupled with table B which is being acted upon by the polishing tools $a$, $a$, in order to warrant a uniform polishing of the portions of the glass adjoining the front edge of table B. By supporting those portions of the tools $a$, $a$ which project beyond this edge during the alternating forward and rearward motion executed by the tables. As shown in Figs. 1 and 2, table C is acted upon by the coarse grinding tools $c$, $c$. During this treatment table C moves forward and rearward together with table D which is attached to its rear edge. However, the means whereby such motion is imparted to the tables is not shown in the drawings and the fact that the tables are in a motion, is merely indicated by a double arrow. To the longitudinal edges of table C there are attached narrow lateral supports or tables $s$ moving along with it and supporting, as shown more particularly in Fig. 2, those portions of the tools which project beyond its longitudinal edges. To the longitudinal edges of table C there are attached narrow lateral supports or tables $s$ moving along with it and supporting, as shown more particularly in Fig. 2, those portions of the tools which project beyond its longitudinal edges.

In Figs. 3 and 4, table C is shown at rest, after the operation of coarse grinding has come to an end. The table has been disengaged from table D and the quality of the ground glass is now being examined. To table D, which shall now be acted upon by the coarse grinding tools, a further table is going to be attached (not shown).

Figs. 5 and 6 show table C in engagement with table B, this latter being also provided with lateral supports or tables $s$ and being acted upon by the fine grinding tools $b$, $b$.

In Figs. 7 and 8, table B is shown at rest, after having been disengaged from table C, and is now ready for inspection.

In Figs. 9 and 10, as mentioned above, table B is shown as being coupled with table A, being acted upon by the polishing tools $a$, $a$.

As shown in the drawings, each table, while under the tools, is always coupled with another table and has narrow lateral supports or tables arranged near its longitudinal edges, in order to warrant a uniform treatment of the glass near the edges. The reciprocating motion imparted to the tables can carry either one or simultaneously both tables of a pair of tables past the tools.

I wish it to be understood that I do not desire to be limited to the exact details of construction shown and described, for obvious modifications will occur to a person skilled in the art.

I claim:—

1. That improvement in the art of surfacing glass which comprises feeding a glass sheet past a cooperating rotating surfacing device operating on one surface of the said sheet, the advance of the sheet being effected by a series of reciprocating movements, the rearward movements of the several reciprocations being less than the forward movements thereof.

2. That improvement in the art of surfacing glass which comprises feeding a sheet past a surfacing device and creating a periodic relative movement between the sheet and surfacing device, which movement is retrograde in respect to the forward movement and of less magnitude.

In testimony whereof I affix my signature.

MAX BICHEROUX.